United States Patent
Watanabe

(10) Patent No.: US 9,361,055 B2
(45) Date of Patent: Jun. 7, 2016

(54) INFORMATION PROCESSING APPARATUS MANAGING A NUMBER OF PRINTED PAGES

(71) Applicant: CANON KABUSHIKI KAISHA, Tokyo (JP)

(72) Inventor: Tomoaki Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/566,297

(22) Filed: Dec. 10, 2014

(65) Prior Publication Data

US 2015/0169270 A1 Jun. 18, 2015

(30) Foreign Application Priority Data

Dec. 16, 2013 (JP) .................. 2013-259539

(51) Int. Cl.
| | | |
|---|---|---|
| *G06F 3/12* | (2006.01) | |
| *G06K 15/02* | (2006.01) | |
| *G06K 15/00* | (2006.01) | |
| *H04N 1/34* | (2006.01) | |

(52) U.S. Cl.
CPC ............ *G06F 3/1241* (2013.01); *G06F 3/1207* (2013.01); *G06F 3/1273* (2013.01); *G06F 3/1285* (2013.01); *G06K 15/188* (2013.01); *G06K 15/1809* (2013.01); *G06K 15/1823* (2013.01); *G06K 15/4005* (2013.01); *G06F 3/1219* (2013.01); *G06F 2206/1504* (2013.01); *H04N 1/342* (2013.01)

(58) Field of Classification Search
None
See application file for complete search history.

(56) References Cited

U.S. PATENT DOCUMENTS

| | | | |
|---|---|---|---|
| 6,633,410 B1 * | 10/2003 | Narushima ......... | H04N 1/6052 358/1.9 |
| 8,456,682 B2 | 6/2013 | Yamakawa | |
| 2003/0086117 A1 * | 5/2003 | Lester et al. ................. | 358/1.15 |
| 2003/0090697 A1 * | 5/2003 | Lester et al. ................. | 358/1.14 |
| 2004/0136023 A1 * | 7/2004 | Sato ...................... | G06F 3/1205 358/1.13 |
| 2004/0190042 A1 * | 9/2004 | Ferlitsch et al. ............ | 358/1.15 |
| 2006/0039026 A1 * | 2/2006 | Lofthus et al. .............. | 358/1.15 |
| 2007/0146772 A1 * | 6/2007 | Castellani ................... | 358/1.15 |
| 2007/0229860 A1 * | 10/2007 | Matsubara ............ | G06F 3/1204 358/1.9 |

(Continued)

FOREIGN PATENT DOCUMENTS

JP 2009-282947 12/2009

*Primary Examiner* — Nicholas Pachol
(74) *Attorney, Agent, or Firm* — Fitzpatrick, Cella, Harper & Scinto

(57) ABSTRACT

An information processing apparatus that communicates with a first printing device and a second printing device that manages a number of printed pages in color in different color levels and a number of printed pages in black and white. The information processing apparatus includes a managing unit configured to manage a number of printed pages in black and white and a number of printed pages classified into each level in the plurality of color levels; a first acquiring unit configured to acquire status information and first log information relating to the first job; a second acquiring unit configured to acquire second log information relating to a second job; and an adjusting unit configured to adjust the number of printed pages relating to the first job based on the status information and the first log information.

8 Claims, 9 Drawing Sheets

(56) References Cited

U.S. PATENT DOCUMENTS

| | | | |
|---|---|---|---|
| 2008/0181651 A1* | 7/2008 | Takesada et al. | 399/82 |
| 2010/0053664 A1* | 3/2010 | Mandel | G06F 3/1211 358/1.15 |
| 2010/0280929 A1* | 11/2010 | Coffey et al. | 705/34 |
| 2010/0328684 A1* | 12/2010 | Cain | G06F 3/1212 358/1.2 |
| 2010/0328703 A1* | 12/2010 | Cain | G06F 3/1211 358/1.15 |
| 2011/0304863 A1* | 12/2011 | Shibuya | H04N 1/6097 358/1.9 |
| 2012/0053885 A1* | 3/2012 | Kato | G06F 3/1221 702/128 |
| 2012/0116935 A1* | 5/2012 | Nagarajan | 705/34 |
| 2012/0206745 A1* | 8/2012 | Shibuya | H04N 1/6097 358/1.9 |
| 2012/0287487 A1* | 11/2012 | Nagarajan | 358/505 |
| 2014/0009794 A1* | 1/2014 | Honda et al. | 358/1.15 |
| 2014/0198336 A1* | 7/2014 | Numata | 358/1.14 |
| 2014/0240727 A1* | 8/2014 | Imai | G06F 3/12 358/1.9 |

* cited by examiner

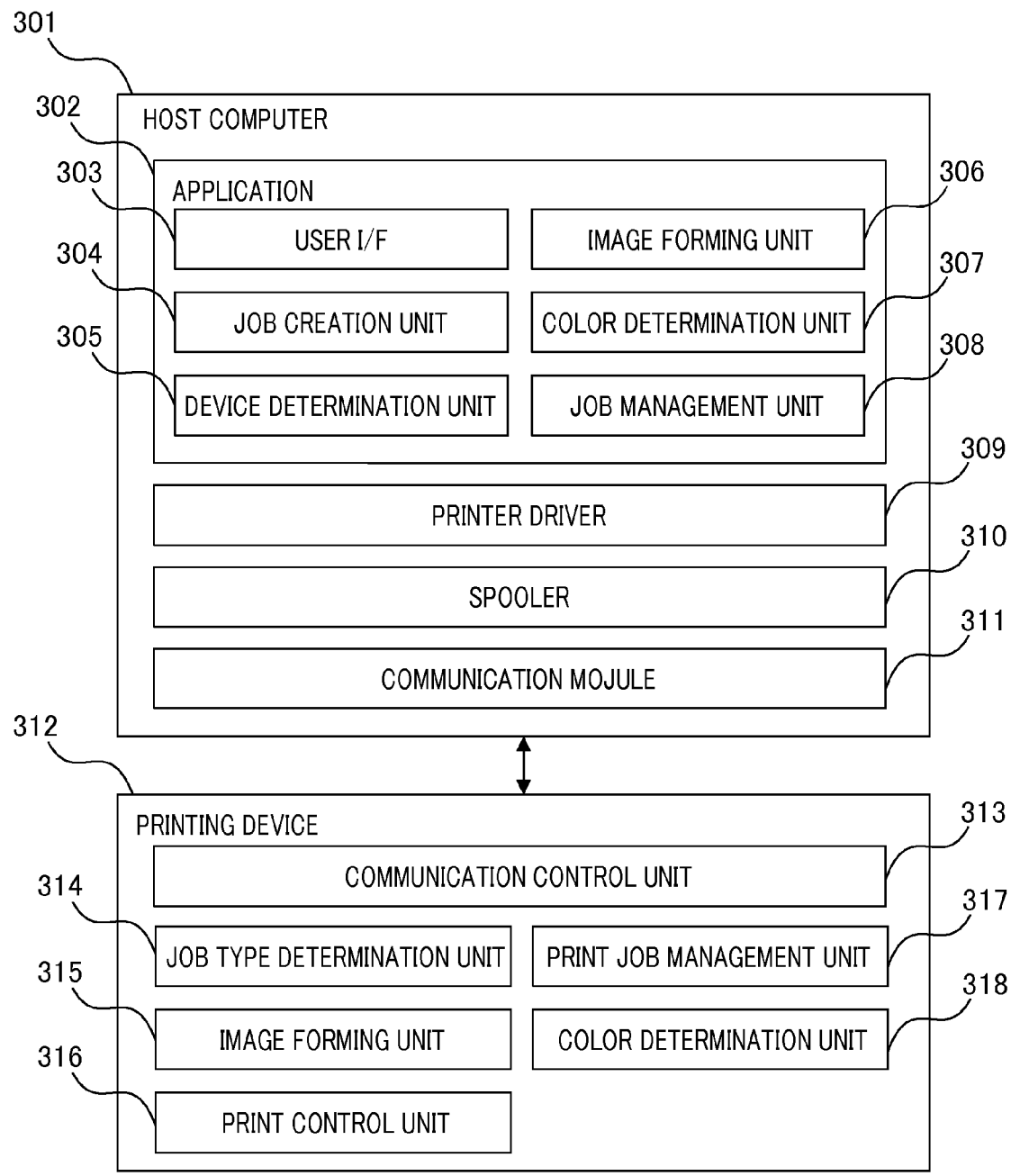

FIG. 4A

| | Types of total counter | Count number | |
|---|---|---|---|
| 401 | | | 402 |
| | 101　total 1 | 170754 | |
| 403 | 108 total (black and white 1) | 68467 | |
| | 232 copy (full color + monochrome 1) | 4778 | |
| 404 | 149 total A (full color + monochrome 1) | 97509 | |
| 405 | 301 large 1 | 83021 | |
| 406 | 302 small 1 | 87733 | |
| | | | |
| | | | |

FIG. 4B

| | Types of total counter | Count number | |
|---|---|---|---|
| 407 | | | 408 |
| | 101　total 1 | 170754 | |
| 409 | 108 total (black and white 1) | 68467 | |
| | 232 copy [total] (full color + monochrome 1) | 4778 | |
| | 233 copy [full area] (full color + monochrome 1) | 1244 | |
| | 234 copy [middle area] (full color + monochrome 1) | 2031 | |
| | 235 copy [low area] (full color + monochrome 1) | 1503 | |
| 410 | 149 total A [total] (full color + monochrome 1) | 97509 | |
| 411 | 150 total A [full area] (full color + monochrome 1) | 23150 | |
| 412 | 151 total A [middle area] (full color 2 + monochrome 2) | 51232 | |
| 413 | 152 total A [low area] (full color 3 + monochrome 3) | 23127 | |
| 414 | 301 large 1 | 83021 | |
| 415 | 302 small 1 | 87733 | |
| | | | |
| | | | |

FIG. 5

| 501 | 502 | 503 | 504 | 505 | 506 | 507 | 508 | 509 | 510 |
|---|---|---|---|---|---|---|---|---|---|
| Job ID | Job type | State | User name | Circulation | Total number of pages | Number of color pages | Number of black-and-white pages | Number of large pages | Number of small pages |
| 2021 | Print | Completed | User01 | 1 | 45 | 45 | 0 | 0 | 45 |

511

| Job ID | Job type | State | User name | Circulation | Total number of pages | Number of color pages | Number of black-and-white pages | Number of large pages | Number of small pages |
|---|---|---|---|---|---|---|---|---|---|
| 3067 | Print | Cancelled | User02 | 1 | 24 | 0 | 0 | 0 | 24 |

| | Types of total counter | Count number | |
|---|---|---:|---|
| 601 | | | 602 |
| | 101 total 1 | 135423 | |
| 603 | 108 total (black and white 1) | 43401 | |
| 604 | 149 total A [total] (full color + monochrome 1) | 92022 | |
| 605 | 150 total A [full area] (full color 1 + monochrome 1) | 35225 | |
| 606 | 151 total A [middle area] (full color 2 + monochrome 2) | 25448 | |
| 607 | 152 total A [low area] (full color 3 + monochrome 3) | 31349 | |

INFORMATION PROCESSING APPARATUS MANAGING A NUMBER OF PRINTED PAGES

BACKGROUND OF THE INVENTION

1. Field of the Invention

The present invention relates to an information processing apparatus, a control method, and a storage medium.

2. Description of the Related Art

Recently, on-demand printing has been adopted at production sites because printing technology is improved by digitization, such as the digitization of an image forming apparatus or orders via the internet. The on-demand printing is performed generally using an electrophotographic printer in order to meet the response to a minimum lot, fast delivery, and the needs of each customer. In the case of such printer, there is a billing model for determining a monthly fee with a billing counter mounted on the printer between a printer vendor and a printing company.

When the a billing counter calculates a charged amount for the printing amount, the billing counter not only calculates the charged amount according to a number of printed pages in color/monochrome/each sheet size, but in recent years also calculates the charge amount by providing color levels (about three color levels) to a conventional full-color by calculating a ratio of color printing area during color printing. The billing counter not only charges a fee of color printing of a printed material using color in one point, but also may charges an appropriate fee in accordance with used amount of consumable such as a toner, for the printing company performing a commercial printing.

Therefore, Japanese Patent Laid-Open No. 2009-282947 discloses a system for predicting and calculating the amount corresponding to the amount of consumed goods when submission of a manuscript. With this system, the amount of the toner measuring rate can be calculated even when it is not actually printed by the printing apparatus, the charge of the metered toner can be calculated by the system, and according to the system, the printing apparatus does not need to provide a determining unit configured to determine the toner usage.

In addition, according to a method disclosed in Japanese Patent Laid-Open No. 2009-282947, the amount can be calculated without using the mechanism of the accounting counter which is calculated on the printing apparatus. Therefore, it is possible to provide customers with the same fee structure even if both new models with a metered charging counter and an old model with a conventional charging counter of monochrome/full color are provided.

However, the method disclosed in Japanese Patent Laid-Open No. 2009-282947 is a method for the estimating with the same fee structure, and is not a method for measuring the printing result of the same fee structure. For example, if a paper jam, a communication error, or the like occurs, the actual printed pages may be less than expected printed pages. However, according to the predictive calculation disclosed in the Japanese Patent Laid-Open No. 2009-282947, the printed pages that are more than that of the print result may be calculated. Also, a recent printing apparatus can make a print job wait on the printing apparatus, and the user can intentionally change the printed pages. In this case, the user can print more the pages than the estimated pages.

In the Japanese Patent Laid-Open No. 2009-282947, an imaging forming unit of an external controller is used. However, in this case, only the print job via the external controller can be estimated. In other words, the system may be applied only when all printing apparatuses are used for a print job. In contrast, when the job such as copy is used, another modification is required.

SUMMARY OF THE INVENTION

The present invention provides an image processing apparatus that can aggregate the counter unified into one system even when two different models having the different configurations of the counter value are present in the section that is the object of aggregation.

According to an embodiment of the present invention, an information processing apparatus that communicates with a first printing device that manages a number of printed pages in a single color level and a number of printed pages in black and white, and a second printing device that manages a number of printed pages of each level in a plurality of color levels and the number of printed pages in black and white is provided that includes a receiving unit configured to receive a job; a managing unit configured to manage a number of printed pages in black and white and a number of printed pages classified into each level in the plurality of color levels, for a first job corresponding to a reference of the management in the second printing device, if a destination of the first job received by the receiving unit is the first printing device; a first acquiring unit configured to acquire status information for processing of the first job and first log information relating to the first job from the first printing device if the first job has been transmitted to the first printing device; a second acquiring unit configured to acquire second log information including a number of printed pages in black and white and a number of printed pages classified into each level in the plurality of color levels relating to a second job from the second printing device if a destination of the second job received by the receiving unit is the second information and the second job has been transmitted to the second printing device; and an adjusting unit configured to adjust the number of printed pages relating to the first job managed by the managing unit based on the status information and the first log information acquired by the first acquiring unit.

According to the present invention, an information processing apparatus that can aggregate the counter unified into one system even when two different models having the different configurations of the counter value are present (the conventional model and the new model are mixed) in the section that is the object of aggregation can be provided.

Further features of the present invention will become apparent from the following description of exemplary embodiments with reference to the attached drawings.

BRIEF DESCRIPTION OF THE DRAWINGS

FIG. 3 is a block diagram illustrating the software configuration of the host computer and the printing device.

FIGS. 4A and 4B are diagrams illustrating a counter value in the printing device.

FIG. 5 is a diagram illustrating an example of Job Log sent from the printing device.

FIG. 6 is a diagram illustrating the configuration of the counter recorded by the host computer.

DESCRIPTION OF THE EMBODIMENTS

Hereinafter be described with reference to the drawings and embodiments for carrying out the present invention.

Figure 1:
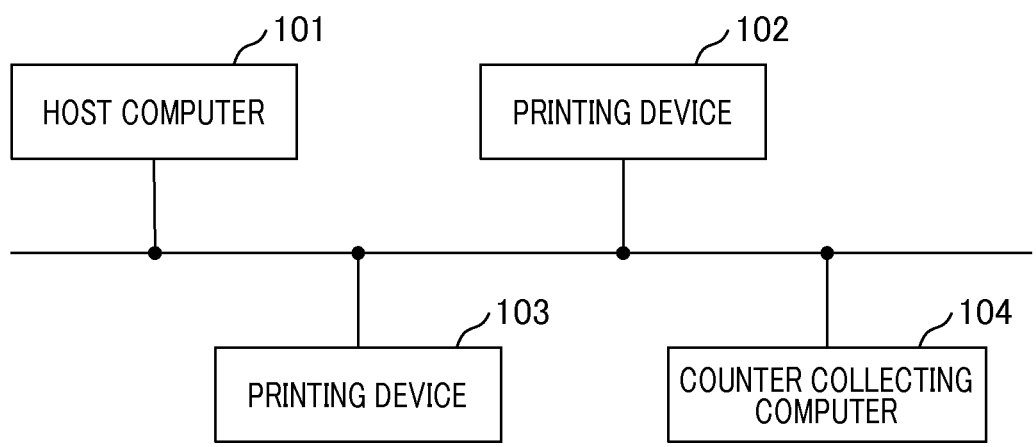
FIG. 1 is a diagram illustrating a printing system according to an embodiment of the present invention.

FIG. 1 illustrates an example of a network configuration of a printing system according to the present embodiment. The printing system according to the present embodiment includes a host computer 101, two types printing devices 102 and 103, and a counter collecting computer 104 for collecting the counters. The host computer 101, the printing devices 102 and 103, and the counter collecting computer 104 are each connected to communicate with each other by a known communication techniques.

The host computer 101 may be, for example, an information processing apparatus used by a user, and performs instructions for generating image data, print instructions, and the like. The printing device 102 and 103 are devices that receive the printing data received from the host computer 101 via the network to perform printing on a recording medium such as actual paper by using known printing techniques such as inkjet technology, electrophotography, and the like. Also, the printing devices 102 and 103 may have a function for reading a document using a scanner, copying the read document, and converting the read document into the image data to send by email or the like. Furthermore, the printing devices 102 and 103 may have only a printer function only, without a scanner function.

Here, during a processing of a print job, the printing device 102 classifies printed pages into a plurality of color levels (three color levels in the present embodiment) depending on the amount of the color toner of each page included in the job so as to count a number of printed pages classified into each level. For example, a printed page in which the color toner is not used is counted as a monochrome (black and white) page. Note that the color levels depending on the amount of the color toner is not limited to the three color levels, and may have color levels other than the three color levels.

In contrast, during processing of the print job, the printing device 103 classifies each printed page included in the job into monochrome or full color (i.e., one color level) so as to count a number of each printed page. The printing device 103 uniformly counts the page in which the color toner is used as a color page, even if the usage amount of the color toner is small amount or large amount. The counter value illustrating the printed pages counted by the printing devices 102 and 103 may be collected as, for example, a counter for billing by the counter collecting computer 104.

In general, for commercial printing, a plurality of the host computers 101 and printing devices 102 and 103 are present in one store. The plurality of the host computers 101 can send the print job for each of the printing devices 102 and 103 in the same store. The counter collecting computer 104 may be present in a physically remote location and may perform monitoring of a plurality of stores if the counter collecting computer 104 is present in the same network.

In the present embodiment, the host computer 101 does not carry out the count of the print result for the printing apparatus 102. This is because a substitute processing of the counter by the host computer 101 cannot be applied to any processing other than the print job. By not performing the substitute processing of the counter by the host computer 101, other function such as copying can be used normally on the printing device 102.

The counter collecting computer 104 identifies the printing device from IP address information that has been registered in advance so as to acquire the counter information of the identified printing device. For the printing device 103, the host computer 101 counts the number of printed pages in color. For the other count, the counter information is acquired in the same way as the printing device 102. If the host computer 101 holds the value of all counter types, the counter collecting computer 104 accesses only the host computer 101 instead of the printing device 103 to collect the counter.

The host computer 101 has the counter table of all printing devices 103 for which there is a possibility that the host computer 101 will transmit, and transmits the counter value of the appropriate printing device in response to an inquiry from the counter collecting computer 104. The print results for the printing device 103 may be stored in an external HD (storage device) area at one time. In this manner, the counter collecting computer 104 does not need to perform the processing for integrating the count for each printing device after collecting the counter.

Figure 2:
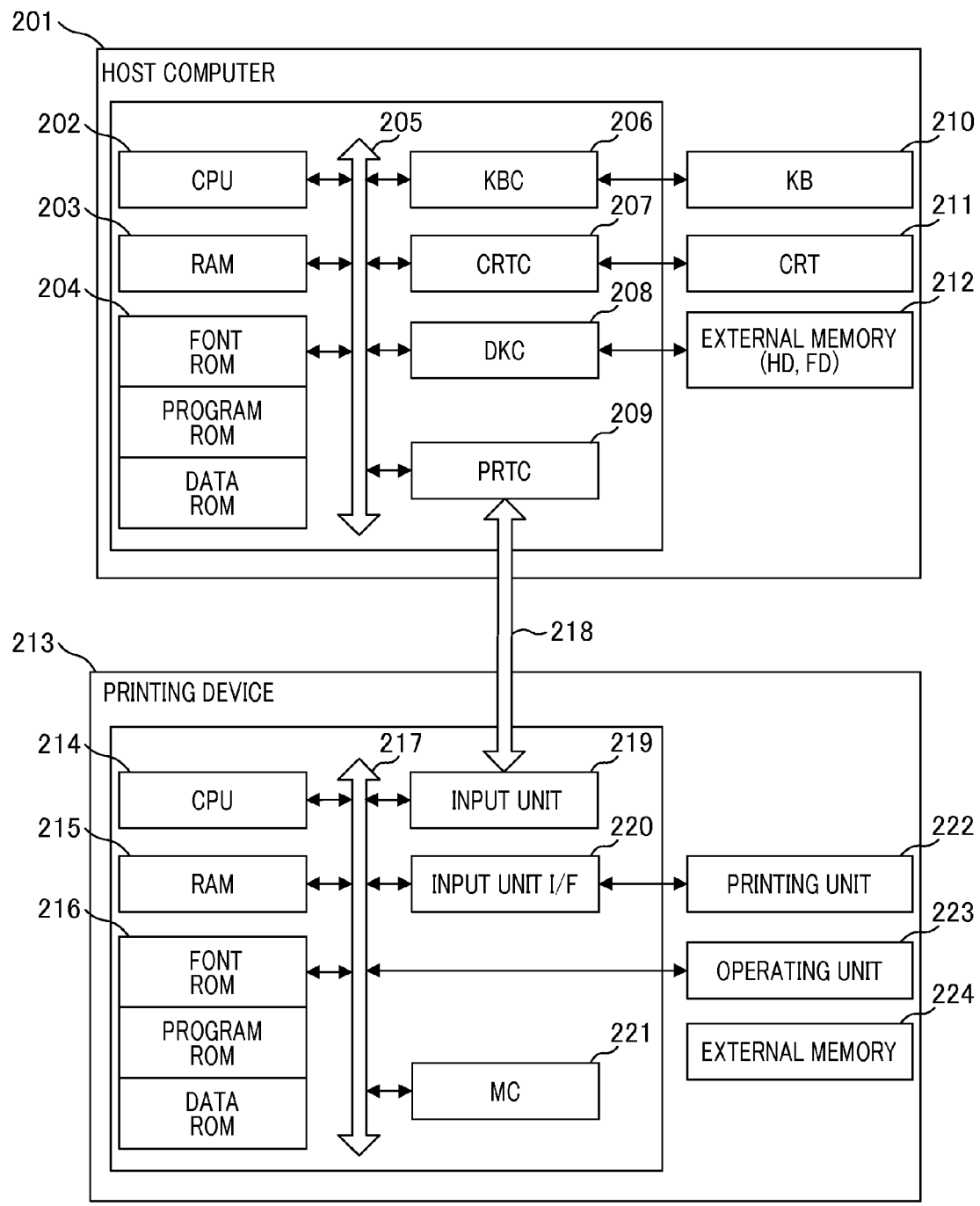
FIG. 2 is a diagram illustrating the internal configuration of a host computer and a printing device.

FIG. 2 is a diagram illustrating the internal configuration of a host computer and a printing device. Note that a single device, a system consisting of a plurality of devices, or a system performing the processing via a network such as LAN, WAN, or the like may be adopted if the function according to the present embodiment can be performed.

With reference to FIG. 2, the host computer 201 comprises a CPU 202 that performs a document processing in which a graphic, an image, a text, a table (including a spreadsheet and the like), and the like are mixed based on the document processing program and the like stored in a ROM for program of a ROM 204 or the external memory 212 or the program ROM of ROM204 I equipped with a CPU202 to perform document processing. CPU202 performs overall control of the printing devices connected to the system bus 205. The CPU 202 performs overall control of each printing device connected to a system bus 205.

An operating system program (hereinafter refer as "OS") that is a control program of the CPU 202, a printer driver as described below, and the like are stored in the program ROM of a ROM 204 or the external memory 212. Font data used during the document processing and the like are stored in a font ROM of a ROM 204 or the external memory 212. Also, various data used during the document processing are stored in a data ROM of a ROM 204 or the external memory 212.

The RAM 203 functions as a main memory of the CPU 202, a work area, and the like. A keyboard controller (KBC) 206 controls a key input from a keyboard 210 and a pointing device (not shown). A CRT controller (CRTC) 207 controls a display of a CRT display (CRT) 211. A disk controller (DKC) 208 controls access to the external memory 212. The external memory 212 is a storage device such as a hard disk (HD) that stores a boot program, various applications, font data, a user file, an editing file, printer control command generation program (hereinafter refer as "printer driver"), and the like.

A printer controller (PRTC) 209 is connected to a printing device 213 via an interactive interface (interface) 218, and performs a communication control processing with the printing device 213. Note that the CPU 202 performs, for example, an expand (rasterizing) processing of outline font to a display an information RAM set on the RAM 203. In addition, a WYSIWYG (What You See Is What You Get) technology in which an image is displayed on the CRT 211 is the same as a printed image.

Also, the CPU 202 opens various windows that have been registered based on the command indicated by a mouse cursor or the like (not shown) on the CRT 211, and performs various data processing. If the user performs printing, the user opens a window related to the print setting and performs the setting of the print processing method for the printer driver which includes the setting and printing device and printing mode selection.

Next, the printing device 213 may be either the printing device 102 or the printing device 103 according to the present embodiment, and both printing devices have the same configuration. The printing device 213 is controlled by a CPU 214. The CPU 214 outputs an image signal as output information to a printing unit (printer engine) 222 connected to a system bus 217 based on a control program and the like stored in a program ROM of a ROM 216 or a control program and the like stored in an external memory 224. Also, a control program and the like of the CPU 214 are stored in the program ROM of the ROM 216.

Font data and the like used in generating the output information are stored in the font ROM. If the printing device has no the external memory 224 such as a hard disk, information or the like used on the host computer is stored in the data ROM. The CPU 214 can perform the communication processing with the host computer via an input unit 219, and notifies the host computer 201 about the information and the like in the printing device.

A RAM 215 functions as a main memory of the CPU 214 or a work area, and is configured to expand a memory capacity by an optional RAM connected to an expansion port (not shown). Note that the RAM 215 is used as an output information mapping area, an environment data storage area, NVRAM, and the like. The hard disk (HD) or the external memory 224 such as an IC card is controlled by the access by a memory controller (MC) 221. The external memory 224 is connected as an option and stores font data, an emulation program, form data, and the like.

An operation unit 223 is provided with a switch for operating on an operation panel, a LED display, and the like. The present embodiment is provided not only one external memory 224 but also a plurality of external memories 224, and the external memory 224 is configured to connect the plurality of external memories in which an option card and a program for interpreting a printer control language having different language systems in addition to internal font. Furthermore, the external memory 224 may have a NVRAM (a nonvolatile memory) (not shown) and store the printer mode setting information from the operation panel 223 and may store printer mode setting information from.

FIG. 3 is a block diagram illustrating the software configuration of the host computer and the printing device according to the present embodiment. A module within a host computer 301 is stored in the ROM 204 or the external memory 212. A module within a printing device 312 is stored in the ROM 216 or the external memory 224.

An application 302 receives the print data such as an image, and, for example, a word file format provided by Microsoft, Portable Document Format (PDF) provided by Adobe Systems, and the like. At the same time, the application 302 receives printing setting (Print Ticket) such as the circulation or paper size. A job creation unit 304 receives the input from a user I/F and creates print job object. On the point, known technologies are used, and a detailed description thereof will be omitted.

A printing device (device) determination unit 305 determines whether a specified printing device is the printing device 102 or the printing device 103 according to the content that has been previously registered. This configuration is similar to the determination of whether or not the specified printing device is a support model in a traditional application. If the printing device determination unit 305 determines that the specified printing device is the printing apparatus 103, an image forming unit 306 performs the image forming processing in the host computer 301 once. After image forming, a color determination, which is calculating a number of printed pages classified into each level in the plurality of color levels, is performed based on a determination reference by a color determination unit 307. A job management unit 308 transmits a print instruction to a printer driver 309 based on the object created by the job creation unit 304 without waiting for the result of the color determination in parallel with the color determination.

If the printing device determination unit 305 determines that the specified printing device is the printing apparatus 102, the job object created by the job creation unit 304 is transmitted to the job management unit 308 immediately without performing the image forming processing and the color determination. After transmitting the print instruction to the printer driver 309, the printing is performed by software in the printing device 312 via the spooler 310 and a communication module 311. The determination reference of color by the color determination unit 318 of the printing device 102, which an image forming unit 315 that performs the printing after image forming, is different from that of the printing device 103. However, on this point, known technologies are used, and a detailed description thereof will be omitted.

In the present embodiment, the number of printed pages is counted in accordance with the image determination reference of the printing device 102, but a counting system may be made to conform to the printing device 103 by replacing the previous determination reference of the printing device. Also, the counting system has three or more types such as, for example, A, B, and C, or a type for unifying one counting system <A> with the other two types <B, C>. In this case, the color determination unit 307 uses the counting system the same as printing device A. In this manner, it is possible to change each time by each contract with the customer which counting system is used.

FIGS. 4A and 4B are diagrams illustrating a counter value in the printing device. FIG. 4A illustrates an example of the configuration of the counter value in the printing device 103, and FIG. 4B illustrates an example of the configuration of the counter value in the printing device 102. The counter value shown in FIG. 4A has a plurality of counter types 401 and a number of each segment (count number) 402. As the count type, not only the color segment of monochrome 403 and full color 404, but also a number of printed pages of large-based paper 405 and a number of printed pages of small-based paper 406 are included.

The counter value shown in FIG. 4B has a plurality of counter types 407 and a number of pages thereof (count number) 408 as shown in FIG. 4A. Also, as the count type, monochrome 409, full color 410, large-based paper 414, small-based paper 415, and the like are included. Furthermore, as shown in FIG. 4B, in the printing device 102, the printing type of the full color 410 is classified in detail, the detailed number in each full area color 411, middle area color 412, and low area color 413 is counted, and the number of printed pages thereof are included.

Here, the full area color indicates a high rate (80%) and the middle area color indicates a middle rate (20 to 80%) in a pixel rate of color of bitmap data. Furthermore, the low color area indicates a low rate (20% or less) in the pixel rate of color. Threshold value of the color level can be varied by setting, and a rate thereof may be different from that of the present embodiment. Also, the determination system is called a pixel count system, but a system other than the pixel color system may be adopted. Furthermore, the determination system described above is also one example of the count system, and the system is applicable to a count between two models that have the configuration of the counter value.

FIG. 5 is a diagram illustrating an example of Job Log, that includes status information and log information, held by each printing device. In the present embodiment, the print result is confirmed by the Job Log after the printing is completed by the application. This processing is performed similarly in any of the printing device 102 or the printing device 103. Note that the Job Log may determine ID that can identify the job and information of the print results and the number of printed pages thereof, and is not limited to the configuration of the present embodiment.

The information of Job ID 501, job type 502, state of job 503, sending user name 504, circulation 505, and a number of printed pages is included in the Job Log. As the number of printed pages, total number of pages 506, number of printed pages in full color 507, number of printed pages in black-and-white pages 508, number of large-based printed pages 509, and number of small-based printed pages 510 are included in the Job Log acquired from the printing device 103. The job management unit 308 of the job sending application 302 has the unique Job ID of the application, and this is associated with the Job Log included in the printing device. Thus, by acquiring the Job Log, it can be seen whether the printing has succeeded/failed for any job. If it is determined that the printing is successful by confirming the Job Log, it is considered that the number of the printed pages that the color determination unit 307 has determined is established, and the number of the printed pages is stored as the count value in the ROM 204 of the host computer 201 or the external memory 212.

The Job Log acquired from the printing device 312 includes not only successful printing, as with ID2021 (511), but also canceled jobs on the printing device and the like. If the job is canceled, as with ID3067 (512), the record count is balanced out by matching against the number which is actually output.

For example, it is assumed that the color determination result in the host computer 301 of the job ID3067 is high area color on the 23rd page, low area color on the 24th page, and high area color on the 25th page. The state of Job ID3067 (512) in the Job Log is "Cancelled", and the total number of pages is 24. Therefore, this is means that only 24 pages of color pages are output.

For this reason, the host computer 301 stores the high area color on the 23rd page to the low area color on the 24th page in the count area. In this case, even if the calculation has finished, the result of the color determination on 25th page and subsequent pages is not stored in the counter area of the host computer 301, but is discarded.

In the present embodiment, an actual value of the number of printed pages that the Job Log has matches only when the job is "Cancelled", but the total number of printed pages may match even when the job is "Completed". As a result of matching, if the calculation result in the host computer is different from the actual value, it may be left the record in the log. In this case, if any failure occurs in the color determination unit 307 of the host computer and the calculation of the number of printed pages is wrong, the failure can be discovered during collecting, and the error can be discovered, and it is possible to help support, for example, the adjustment of the billing amount and the like.

FIG. 6 is a diagram illustrating an example of the configuration of the counter recorded by the host computer 301. Similar to the counter that the printing device has, a counter type 601 and a number of printed pages thereof (count number) 602 are included. In addition, similar to the printing device 102, each number of printed pages (count number) in monochrome 603, full color total 604, full area color 605, middle area color 606, and low area color 607 are each recorded.

By recording the job that has been printed by the printing device 103 as described the above, the counter value of the same configuration as the printing device 102 can be collected. This counter table can collect the number of printed pages classified into each level of the printing device by recording the number of the printing device 103, but is configured to have one counter table for one host computer. In this case, the print result of each one of the printing devices 103 cannot be collected, but the total number of printed pages sent from the host computer can be collected, and disk space and collecting costs can be saved.

Also, in the present embodiment, the host computer records only the color count which is the difference between the printing device 102 and the printing device 103, but the host computer records all counter types including the large-based paper/small-based paper or the like that the printing device 103 has. In this case, a determination unit module is required in addition to the color determination in the host computer, but for the printing device 103, the collecting cost can be saved because the collecting the counter can be performed only from the host computer.

Figure 7:
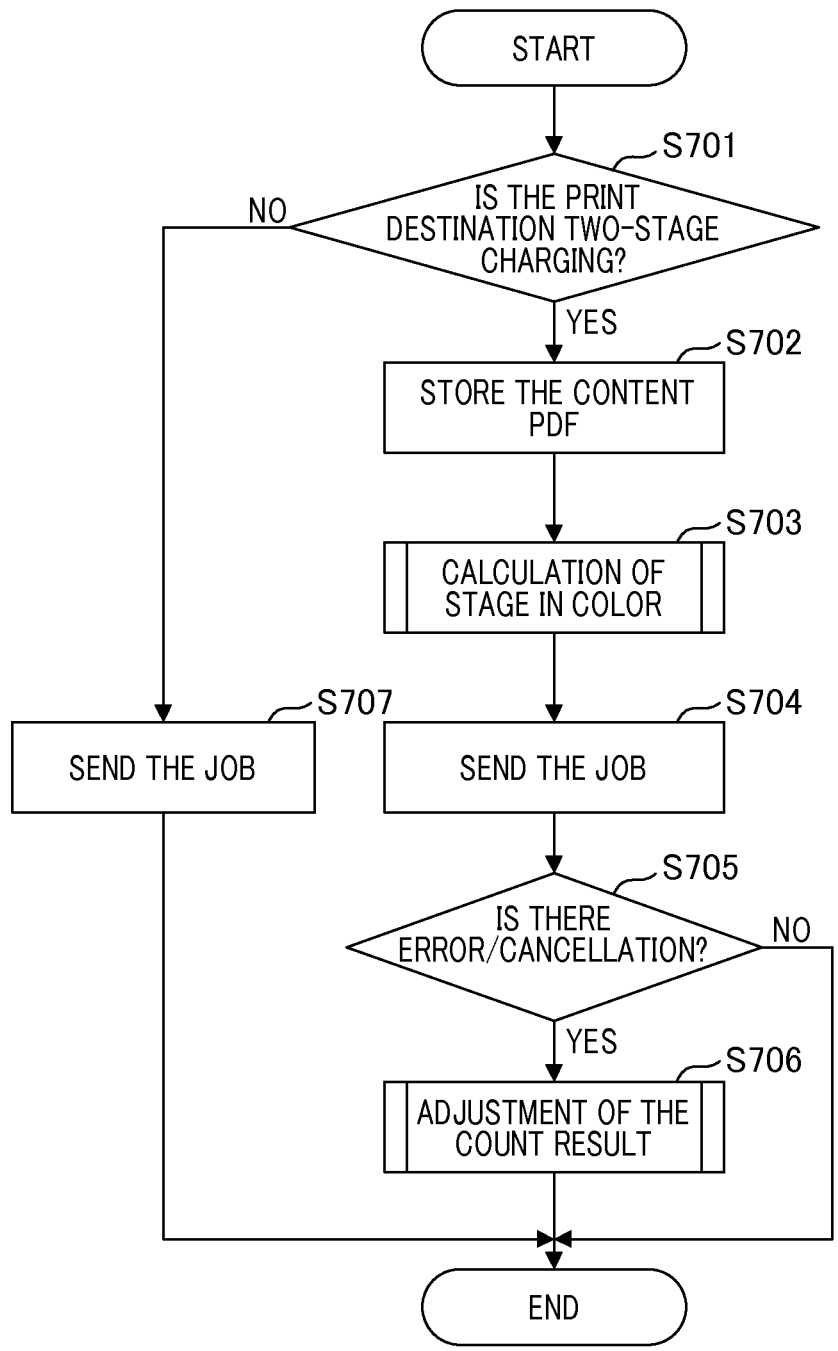
FIG. 7 is a flowchart illustrating the processing of the entire printing system.

FIG. 7 is a flowchart illustrating the processing of the entire printing system. Firstly, in the present embodiment, it is determined whether or not a sending destination (print destination) is the printing device 103 (step S701). In other words, it is determined whether or not the print destination is two-color level charging. If it is determined that the print destination is the printing device 103 (yes), a content pdf that is an object to be printed is stored because the color determination is performed in the host computer (step S702). Then, the color determination in which the number of printed pages classified into each level in the plurality of color levels managed is calculated when the printing is performed in the printing device 102 is performed for the stored content pdf by flow of FIG. 8 as described below (step S703).

In parallel with the color determination, a job (a first job) is transmitted to the printing device 103 that is the printing destination, and the print completion notification is received from the printing device 103 (step 704). In the present embodiment, the printing transmission processing by acquiring the Job Log after receiving the print completion notification as described the above is considered to be the completion, but at this point, since the known technique is used, a detailed description thereof will be omitted. After acquiring the Job Log, it is determined whether or not there is error/cancel for the job, and if it is determined that there is the error/cancel (yes), adjusting of the count result is performed by the flow of FIG. 9 as described the below (step S706).

On the other hand, in step S701, if it is determined that the sending destination is not the printing device 103 (no), that is, if it is determined that the sending destination is the printing device 102, and only sending a job (a second job) is performed (step S707). In step S705, it is determined that there is not an error/cancel (no), and the processing ends.

Note that the printing device 102 is enable to use copy and the like in addition to printing by requesting the color determination and the processing for counting the number thereof to the printing device. Of course, for the printing device 102, similar to the printing device 103, the color determination may be performed by the host computer. In this case, only printing operation from the host computer to which the present embodiment is applied may be available to the function of the printing device.

Figure 8:
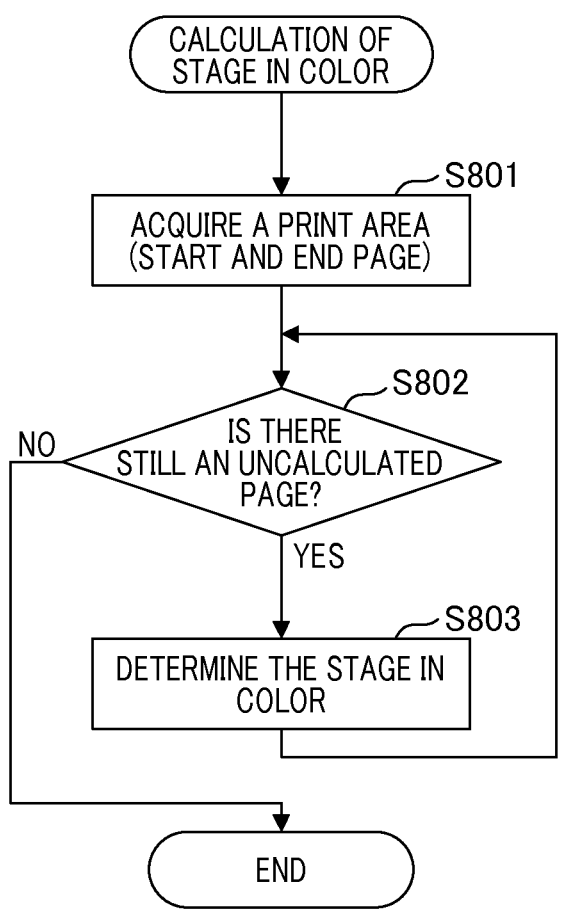
FIG. 8 is a flowchart illustrating the calculation processing of color level.

FIG. 8 is a flowchart illustrating the color determination processing. Firstly, a print area [start page and end page] in the stored content pdf is identified and acquired (step S801). Then, the calculation of color level is performed, and it is determined whether or not there is uncalculated page (step S802). If there is the uncalculated page (yes), the processing proceeds to step S803. Then, the calculation of the color level is performed for the uncalculated page, the color level in each color page is determined (step S803), and the processing returns to step S802 to determine whether or not there is uncalculated page. In contrast, if there is no uncalculated page (no), the color determination processing ends.

Figure 9:
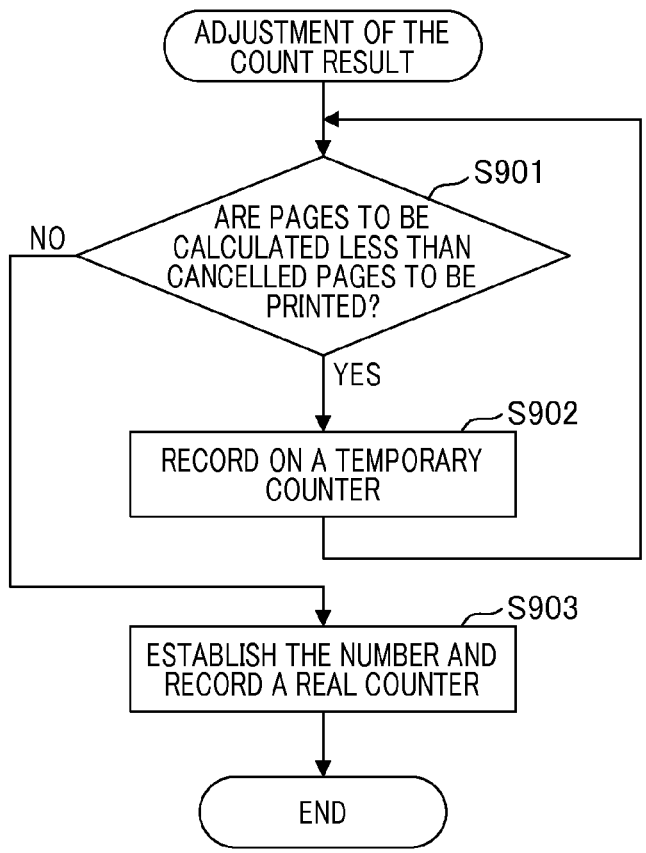
FIG. 9 is a flowchart illustrating the adjusting processing of the count result.

FIG. 9 is a flowchart illustrating the adjusting processing of the count result in step S706 if it is determined that there is an error/cancel for the job in step S705 in FIG. 7, that is, if the printing of the page intended by the user is not successful due to an error or cancellation for the job. In the present embodiment, an area at which the print result of the job is temporary counted is called a "temporary counter" and an area at which the number of printed pages of all jobs on the printing device is called a "real counter". The real counter is used for collecting the counter by the counter collecting computer 104.

Firstly, the determination result of color level in each page determined in FIG. 8 is recorded in the temporary counter, and it is determined whether or not a page to be calculated is less than a page to be print canceled (error or cancellation) (step S901). If it is determined that the page to be calculated is less than the page to be print canceled (yes), the determination result of the page to be calculated is recorded in the temporary counter (step S902). Then, the processing returns to step S901, and the determination continues until reaching the page which is print canceled. In contrast, if it is determined that the page to be calculated is more than the page to be print canceled, that is, the page which is print canceled is reached (no), the determination result is stopped to record in the temporary counter, and the number recorded in the temporary counter is confirmed and recorded in the real counter (step S903).

Figure 10:
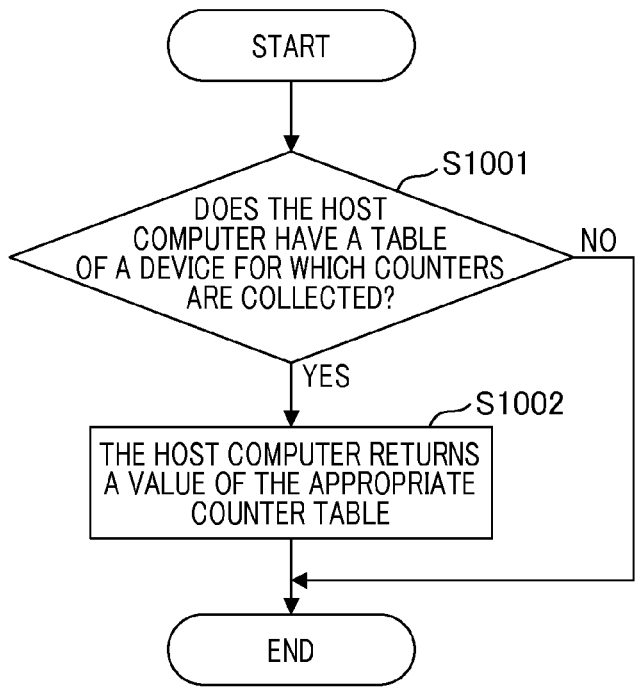
FIG. 10 is a flowchart illustrating the counter value recovery processing.

FIG. 10 is a flowchart illustrating the processing when the counter collecting computer 104 sends a counter acquisition request for the purpose of collecting the counter value. Firstly, it is determined whether or not the host computer has the counter of the requested printing device ID (step S1001). If it is determined that the host computer has the counter of the requested printing device ID (yes), the requested value of the counter table is returned (step S1002), and the collecting the counter table from the host computer 101 is completed. On the other hand, if it is determined that the host computer does not have the counter of the requested printing device ID (no), the requested value of the counter table is also returned.

As described above, according to the present embodiment, an information processing apparatus that can collect the counters unified into one system even when two different models having different counter value configurations are present (the conventional model and the new model are mixed) in the section that is the object of collection can be provided.

OTHER EMBODIMENTS

In this embodiment, the image forming unit and the host computer are equipped with a color determination unit, but as another embodiment, the color determination function may be placed on a separate computer physically. In this case, processing in the host computer will store color determination, and the content data necessary for the counter recorded, print tickets, and error information. In addition, the data area in the storage of the content will be consumed and a cost of transferring data to the computer for color determination will be incurred, but there is the merit that no load is applied to the host computer.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-259539, filed Dec. 16, 2013, which is hereby incorporated by reference herein in its entirety.

What is claimed is:

1. An information processing apparatus that communicates with a first printing device that manages a number of printed pages in a single color level and a number of printed pages in black and white, and a second printing device that manages a number of printed pages of each level in a plurality of color levels and the number of printed pages in black and white, the apparatus comprising:

a processor and a memory storing a program configured to function as:
 a receiving unit configured to receive a job;
 an image forming unit configured to perform an image forming processing of a first job received by the receiving unit if a destination of the first job is the first printing device and not to perform an image forming processing of a second job received by the receiving unit if a destination of the second job is the second printing device;
 a managing unit configured to calculate, for the first job, a number of printed pages in black and white and a number of printed pages classified into each level in the plurality of color levels, which are not the number of printed pages in the single color level in the first printing device, corresponding to a reference of the management in the second printing device after the image forming processing of the first job, and to manage the calculated number for the first job;

a first acquiring unit configured to acquire status information for processing of the first job and first log information relating to the first job from the first printing device if the first job has been transmitted to the first printing device;

a second acquiring unit configured to acquire second log information including a number of printed pages in black and white and a number of printed pages classified into each level in the plurality of color levels relating to a second job from the second printing device if the second job has been transmitted to the second printing device; and an adjusting unit configured to adjust the number of printed pages relating to the first job managed by the managing unit based on the status information and the first log information acquired by the first acquiring unit, wherein the reference of the management in the second printing device defines each data indicative of ratio of color pixels corresponding to a different one of the plurality of color levels, and wherein the managing unit is configured to calculate the number of printed pages classified into each level for the first job by classifying all color pages included in the first job into each level in the plurality of color levels according to the reference and a number of color pixels of each color page.

2. The information processing apparatus according to claim 1, wherein the status information includes error information or cancellation information for the job.

3. The information processing apparatus according to claim 2, wherein the adjusting unit adjusts the number of printed pages relating to the first job managed based on a number of printed pages to printed page for which the cancellation occurs from the error information or the cancellation information.

4. The information processing apparatus according to claim 1, further comprising:

a determining unit configured to determine whether a destination of the job is the first printing device or the second printing device according to a content which has been previously registered, wherein, if the determining unit determines that the destination of the job is the first printing device, the managing unit manages the number of printed pages in black and white and the number of printed pages classified into each level in the plurality of color levels, the job is transmitted to the first printing device, and the first acquiring unit acquires the status information and the first log information.

5. The information processing apparatus according to claim 4, wherein, if the determining unit determines that the destination of the job is the second printing device, the job is transmitted to the second printing device and the second acquiring unit acquires the second log information.

6. The information processing apparatus according to claim 1, wherein the management of the number of printed pages in black and white and the number of printed pages classified into each level in the plurality of color levels by the managing unit is performed in parallel with the transmission of the job to the first printing device.

7. A method for controlling an information processing apparatus that communicates with a first printing device that manages a number of printed pages in a single color level and a number of printed pages in black and white, and a second printing device that manages a number of printed pages of each color level in a plurality of color levels and the number of printed pages in black and white, the method comprising:

receiving a job;

performing an image forming processing of a first job received in the receiving if a destination of the first job is the first printing device and not to perform an image forming processing of a second job received in the receiving if a destination of the second job is the second printing device;

calculating, for the first job, a number of printed pages in black and white and a number of printed pages classified into each level in the plurality of color levels, which are not the number of printed pages in the single color level in the first printing device, corresponding to a reference of the management in the second printing device after the image forming processing of the first job, and managing in a management unit the calculated number for the first job;

acquiring status information of processing of the first job and first log information relating to the first job from the first printing device if the first job has been transmitted to the first printing device;

acquiring second log information including a number of printed pages in black and white and a number of printed pages classified into each level in the plurality of color levels relating to a second job from the second printing device if the second job has been transmitted to the second printing device; and adjusting the number of printed pages relating to the first job managed in the managing based on the acquired status information and the acquired first log information, wherein the reference of the management in the second printing device defines each data indicative of ratio of color pixels corresponding to a different one of the plurality of color levels, and wherein the managing unit is configured to calculate the number of printed pages classified into each level for the first job by classifying all color pages included in the first job into each level in the plurality of color levels according to the reference and a number of color pixels of each color page.

8. A non-transitory storage medium storing a computer readable program for causing a computer to execute a controlling method executed in an information apparatus that communicates with a first printing device that manages a number of printed pages in color in a single color level and a number of printed pages in black and white, and a second printing device that manages a number of printed pages of each level in a plurality of color levels and the number of printed pages in black and white, the program comprising:

receiving a job;

performing an image forming processing of a first job received in the receiving if a destination of the first job is the first printing device and not to perform an image forming processing of a second job received in the receiving if a destination of the second job is the second printing device;

calculating, for the first job, a number of printed pages in black and white and a number of printed pages classified into each level in the plurality of color levels, which are not the number of printed pages in the single color level in the first printing device, corresponding to a reference of the management in the second printing device after the image forming processing of the first job, and managing in a management unit the calculated number for the first job;

acquiring status information of processing of the first job and first log information relating to the first job from the first printing device if the first job has been transmitted to the first printing device;

acquiring second log information including a number of printed pages in black and white and a number of printed pages classified into each level in the plurality of color levels relating to a second job from the second printing device if the second job has been transmitted to the second printing device; and adjusting the number of printed pages relating to the first job managed in the managing based on the acquired status information and the acquired first log information, wherein the reference of the management in the second printing device defines each data indicative of ratio of color pixels corresponding to a different one of the plurality of color levels, and wherein the managing unit is configured to calculate the number of printed pages classified into each level for the first job by classifying all color pages included in the first job into each level in the plurality of color levels according to the reference and a number of color pixels of each color page.

* * * * *